US009594677B2

(12) United States Patent
Ishii et al.

(10) Patent No.: US 9,594,677 B2
(45) Date of Patent: Mar. 14, 2017

(54) COMPUTER SYSTEM, DATA MANAGEMENT METHOD, AND RECORDING MEDIUM FOR STORING PROGRAM

(71) Applicant: HITACHI SOLUTIONS, LTD., Shinagawa-ku, Tokyo (JP)

(72) Inventors: Yohsuke Ishii, Tokyo (JP); Shoji Kodama, Tokyo (JP)

(73) Assignee: Hitachi Solutions, Ltd., Tokyo (JP)

( * ) Notice: Subject to any disclaimer, the term of this patent is extended or adjusted under 35 U.S.C. 154(b) by 6 days.

(21) Appl. No.: 14/647,653

(22) PCT Filed: Mar. 11, 2013

(86) PCT No.: PCT/JP2013/056564
§ 371 (c)(1),
(2) Date: May 27, 2015

(87) PCT Pub. No.: WO2014/141355
PCT Pub. Date: Sep. 18, 2014

(65) Prior Publication Data
US 2015/0309929 A1    Oct. 29, 2015

(51) Int. Cl.
*G06F 12/08* (2016.01)
*G06F 17/30* (2006.01)

(52) U.S. Cl.
CPC .............. *G06F 12/08* (2013.01); *G06F 17/30* (2013.01); *G06F 17/3061* (2013.01); *G06F 2212/2515* (2013.01)

(58) Field of Classification Search
CPC .. G06F 12/08; G06F 2212/2515; G06F 17/30; G06F 17/30619

USPC .......................................... 711/117, 162, 165
See application file for complete search history.

(56) References Cited

U.S. PATENT DOCUMENTS

| 5,764,972 A | 6/1998 | Crouse et al. | |
|---|---|---|---|
| 8,671,263 B2 * | 3/2014 | Jess ........................ | G06F 3/0605 711/114 |
| 8,949,208 B1 * | 2/2015 | Xu ......................... | G06F 3/0641 707/661 |

OTHER PUBLICATIONS

PCT International Search Report on application PCT/JP2013/056564 mailed Jun. 25, 2013; 1 page.

* cited by examiner

*Primary Examiner* — Jasmine Song
(74) *Attorney, Agent, or Firm* — Foley & Lardner LLP

(57) ABSTRACT

A search server for which data stored in a hierarchical control server utilizing a plurality of storage devices is the object of a search, wherein the search server is designed to update a search index to data while the data exists in an upper-hierarchy storage of the hierarchical control server. Included in a computer system are: a storage unit for storing the usage status of an upper-hierarchy storage area of a hierarchical storage having the upper-hierarchy storage area and a lower-hierarchy storage area; and a determination unit for determining, according to the stored usage status, which process should be given priority between an indexing process for data that is an index-updating candidate among data stored in the hierarchical storage, or a migration process for moving the data to the lower-hierarchy storage area.

9 Claims, 12 Drawing Sheets

FIG.3

| | FILE PATH MANAGING INFO | | | |
|---|---|---|---|---|
| LOGICAL PATH NAME | PHYSICAL PATH NAME | SEARCH SERVER IDENTIFYING INFO | INDEX UPDATE TIME | PRIORITY FLAG |
| /dirA/fileP | Tier1:/dirA/fileP | 192.168.1.10 | 2011/10/20 22:00:00 | INDEXING |
| /dirA/fileQ | Tier1:/dirA/fileQ | 192.168.1.10 | 2011/10/22 23:00:00 | MIGRATION |
| /dirB/fileR | Tier2:/dirB/fileR | null | null | — |
| ... | ... | ... | ... | ... |

| \_111 | | | | |
|---|---|---|---|---|
| HIERARCHICAL STORAGE CONFIG INFO | | | | |
| TIER NAME | STORAGE ID INFO | MEDIA CLASSIFICATION | ACCESS PROTOCOL | ... |
| Tier1 | 192.168.1.20 | HDD | NFS | ... |
| Tier2 | 192.168.1.21 | Tape | LTFS | ... |
| ... | ... | ... | ... | ... |

| 211 INDEX MANAGEMENT INFO | | | | | | |
|---|---|---|---|---|---|---|
| KEYWORD | PERTINENT POSITION INFO | | | | | |
| | FILE ID INFO | PERTINENT POSITION OFFSET | WEIGHT | FILE ID INFO | PERTINENT POSITION OFFSET | WEIGHT |
| abc | f1 | 20, 40 | 1.0, 0.5 | f2 | 15 | 1.0 |
| def | f2 | 40 | 0.5 | null | null | null |
| hij | f1 | 100 | 0.8 | f3 | 40 | 1.0 |
| ... | ... | ... | ... | ... | ... | ... |

```xml
<?xml version="1.0"?>
<migrationPolicy id="001">
 <activateTime>everyday 01:00:00</activateTime>
 <src>Tier1</src>
 <dest>Tier2</dest>
 <targetFilesystem>/dirA</targetFileSystem>
 <condition id="1">
  <filesystemUsageRange>0-79</filesystemUsageRange>
  <targetFile>
    <elapsedTimeAfterLastAccess>10d</elapsedTimeAfterLastAccess>
    <migrationOrder>atime chronological asc</migrationOrder>
    <stopCondition>
      <CompletedMigrationAllCandidateFile />
    </stopCondition>
  </targetFile>
 </condition>
 <condition id="2">
  <filesystemUsageRange>80-100</filesystemUsageRange>
  <targetFile>
    <elapsedTimeAfterLastAccess>1s</elapsedTimeAfterLastAccess>
    <migrationOrder>atime chronological asc</migrationOrder>
    <stopCondition>
      <filesysytemUsageRange>0-69</filesystemUsageRange>
    </stopCondition>
  </targetFile>
 </condition>
</migrationPolicy>
```

| INDEX REGISTRATION INFO ||| 
| FILE ID INFO | FILE PATH NAME | META DATA |
| --- | --- | --- |
| f1 | /dirA/fileP | m1 |
| f2 | /dirA/fileQ | m2 |
| f3 | /dirB/fileR | m3 |
| ... | ... | ... |

STORAGE MANAGEMENT INFO

| Tier | STORAGE ID INFO | ACQUISITION TIME | CAPACITY UTILIZATION RATE [%] | REMAINING CAPACITY [GB] | EXTERNAL INFLOW QUANTITY [MB/sec] | INFLOW QUANTITY FROM OTHER TIERS [MB/sec] | OUTFLOW QUANTITY TO OTHER TIERS [MB/sec] | ... |
|---|---|---|---|---|---|---|---|---|
| Tier1 | 192.168.1.20 | 2011/10/20 10:00:00 | 50 | 100 | 10 | 1 | 10 | ... |
| Tier2 | 192.168.1.21 | 2011/10/20 10:00:00 | 30 | 7000 | 0 | 10 | 1 | ... |
| ... | ... | ... | ... | ... | ... | ... | ... | ... |

| 210 SEQUENCE CONDITION INFO | | | |
|---|---|---|---|
| CAPACITY UTILIZATION RATE OF TIER 1 STORAGE | THE NUMBER OF FILES THAT NEED INDEX UPDATE | PREFERENTIAL EXECUTION PROCESSING | |
| AT LEAST 85% | * | MIGRATION | ... |
| AT LEAST 80% | AT LEAST ONE MILLION FILES | INDEXING | ... |
| AT LEAST 80% | LESS THAN ONE MILLION FILES | MIGRATION | ... |
| LESS THAN 80% | * | INDEXING | ... |
| ... | ... | ... | ... |
| 210a | 210b | 210c | |

COMPUTER SYSTEM, DATA MANAGEMENT METHOD, AND RECORDING MEDIUM FOR STORING PROGRAM

TECHNICAL FIELD

The present invention relates to a computer system, a data management method, and a recording medium for storing a program, and to a computer system using a hierarchical storage, a data management method thereof, and a recording medium for storing a program thereof.

BACKGROUND ART

An increase of the amount of stored data poses a problem that management of a desired storage place of data becomes complicated and complex. In recent years, full text search service and meta data search service have become utilized against such a problem.

In the full text search service, a search server analyzes data such as files stored in a computer system and previously creates a search index. A user can transmit a search query for searching desired data to the search server and access object data on the basis of a result of the search.

In the meta data search service, data each having a set of a meta data name and a meta data value included in search object data is extracted and search indexes of them are previously created. A user can acquire a search result by specifying a search condition concerning the meta data name and the meta data value to a search server.

Inclusive of use and utilization of big data, the amount of data handled in a computer system tends to increase with increasing speed in recent years. It is predicted that search service of a file or the like will become more and more important.

In general, if the amount of data to be stored increases, the storage cost also increases. As a method for decreasing the storage cost, for example, a storage system in which a storage cost per volume is virtually reduced by combining an expensive high-performance upper-hierarchy storage with an inexpensive low-performance lower-hierarchy storage is disclosed in Patent Literature 1. In other words, a technique of a hierarchical storage is disclosed.

In the hierarchical storage, a hierarchical control server stores a file into a suitable storage on the basis of a utilization situation of stored files. For example, the hierarchical control server first stores a file into an upper-hierarchy storage. Thereafter, the hierarchical control server causes migration of data for which an access frequency is low to a lower-hierarchy storage.

CITATION LIST

Patent Literature

PATENT LITERATURE 1: U.S. Pat. No. 5,764,972

SUMMARY OF INVENTION

Technical Problem

By the way, in a case where it is attempted to provide search service by newly adding a search server in an environment in which a DWH (Data Ware House) is provided by utilizing a hierarchical storage, there is a problem that adjustment of timing of execution of migration processing and update processing of an index for search is difficult.

For example, a case where migration of data for which index update is not completed is conducted from an upper-hierarchy storage to a lower-hierarchy storage will now be considered. In a case where index update processing is conducted after migration processing for the lower-hierarchy storage is conducted, a load of conducting data migration in a reverse direction (from the lower-hierarchy to the upper-hierarchy) occurs in the hierarchical storage.

Especially, in a case where the lower-hierarchy storage includes a tape device which is comparatively low in access performance, there is a fear that response performance to reverse migration of desired data will be aggravated.

For causing the data index processing and the migration processing to coexist efficiently, it is also considered to adjust processing schedules in a server that executes the index update and a server that manages the migration. In other words, a case where index creation processing is finished and then the migration processing is started is conceivable. More specifically, control using schedule time to provide each processing with a determinate sequence property is also conceivable. Or control in which attribute information (info) concerning completion or the like of each processing is associated with stored data or the like and each processing is executed by checking the attribute information is also conceivable.

In a case where such a schedule sequence is controlled, however, there is complicatedness that it is necessary to set a migration execution interval and an index update interval separately according to convenience of respective servers. Especially in information systems handling a large amount of data control in recent years, a configuration (config) in which a plurality of search servers access data managed in a DWH is also utilized frequently. There is a fear that time setting of these servers will greatly hamper the convenience.

On the other hand, in the control using the attribute information, there is a problem in a processing load that an attribute must be managed every data. In information systems in recent years in which a large amount of data control is demanded, such management time becomes enormous and there is a fear that the resource cost utilized in the management will also increase.

Solution to Problem

In order to solve the above-described problem, for example, a configuration stated in claim 1 is applied. For example, the configuration is a computer system including:
a storage unit for storing a utilization situation of an upper-hierarchy storage area in a hierarchical storage including the upper-hierarchy storage area and a lower-hierarchy storage area;
a decision unit for determining which of index processing of data that is included in data stored in the hierarchical storage and that becomes an index update candidate and migration processing of moving the data to the lower-hierarchy storage area is to be conducted preferentially, depending upon the utilization situation; and
a control unit for moving the data that becomes the index update candidate to the lower-hierarchy storage area on the basis of a result of the determination.

Advantageous Effects of Invention

According to one aspect of the present invention, indexing of index updating candidate data can be executed in a hierarchical storage depending upon the utilization situation of an upper-hierarchy storage area, scheduling of the index processing and the migration processing is made unnecessary, and the index processing can be executed without increasing the load of the hierarchical storage.

BRIEF DESCRIPTION OF DRAWINGS

FIG. 3 is a schematic diagram showing an example of pass management information utilized in the computer system according to the first embodiment;

FIG. 4 is a schematic diagram showing an example of hierarchical storage configuration information utilized in the computer system according to the first embodiment;

FIG. 5 is a schematic diagram showing an example of index management information utilized in the computer system according to the first embodiment;

FIG. 6 is a schematic diagram showing an example of a migration definition utilized in the computer system according to the first embodiment;

FIG. 7 is a schematic diagram showing an example of index registration information utilized in the computer system according to the first embodiment;

FIG. 8 is a schematic diagram showing an example of storage management information utilized in the computer system according to the first embodiment;

FIG. 9 is a schematic diagram showing an example of sequence condition information utilized in the computer system according to the first embodiment;

DESCRIPTION OF EMBODIMENTS

Hereafter, embodiments of the present invention will be described in detail.

First Embodiment

Figure 1:
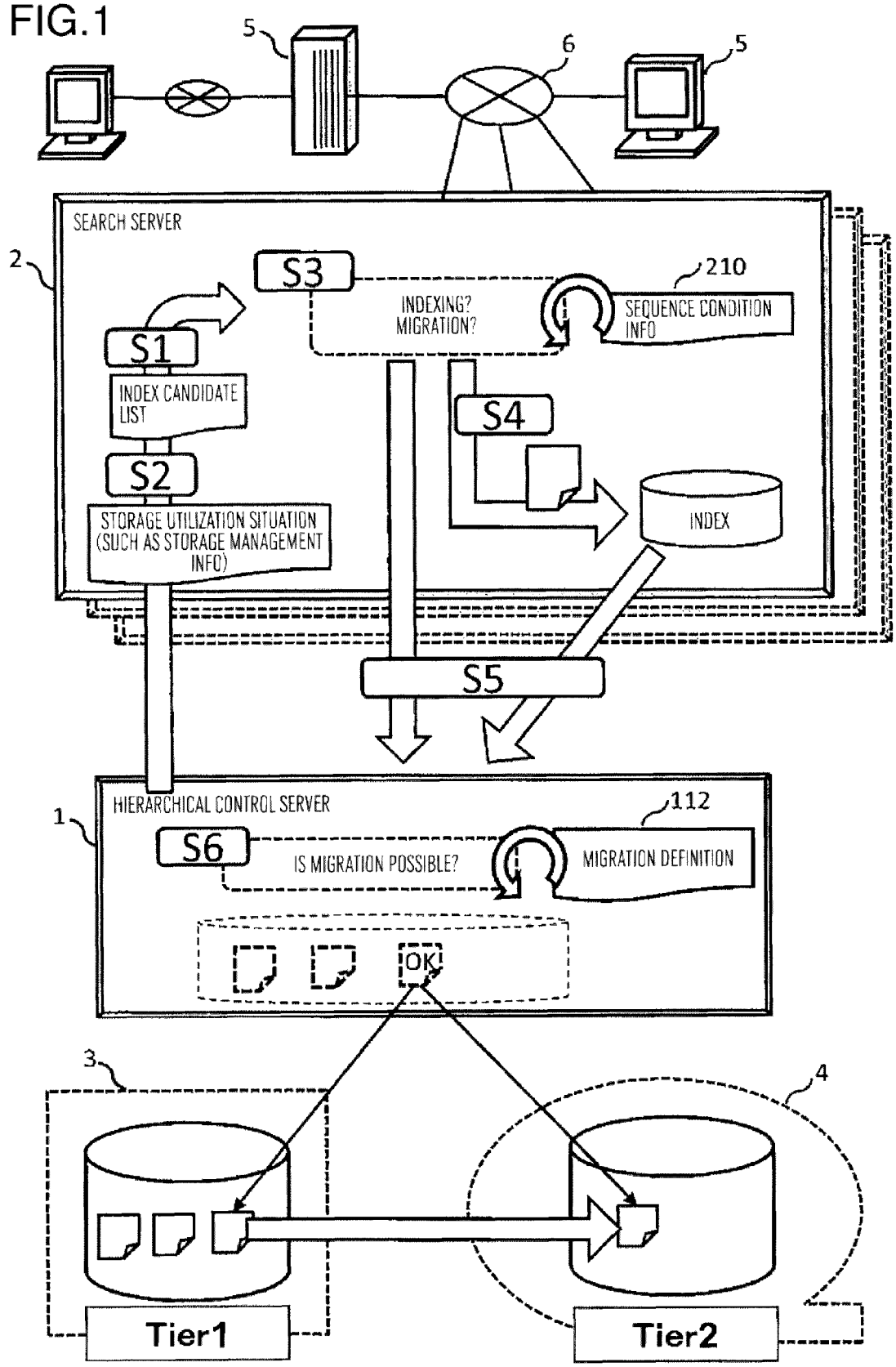
FIG. 1 is a schematic diagram showing an outline of an operation principle of a computer system according to a first embodiment of the present invention.

First, an outline of a principle of a computer system according to a first embodiment of the present invention will be described with reference to FIG. 1.

The computer system includes a hierarchical control server 1, a search server 2, a storage 3, and a storage 4, which are connected to be capable of conducting data communication via a communication line 6. Indexes of data stored in the storages 3 and 4 are managed in the search server 2. An index search is conducted in the search server 2 in response to a search request from a client 5 connected via a communication line 6 or the like. Pertinent data is read out from the storage 3 or 4, and a response result is returned.

It is supposed that the storages 3 and 4 are file storages in which data is stored in a file form. By the way, the present invention is not restricted to file storages, but can be applied to block storages as well.

In the storages 3 and 4, the so-called hierarchical storages are configured. The storage 3 is a storage device of an upper-hierarchy, and a recording medium having high processing performance is used. The storage 4 is a storage device of a lower-hierarchy, and a recording medium that is comparatively low in access performance than the recording medium in the upper-hierarchy storage is used. Data is first stored in the upper-hierarchy storage 3, and then caused to move (migrate) to the lower-hierarchy storage 4 on the basis of a predetermined policy such as an access frequency or elapsed time.

In the hierarchical control server 1, it is determined which of data migration processing from the storage 3 to the storage 4 and index update processing on data stored in the storage 3 is to be executed preferentially. Then, each processing is executed in accordance with the determination. Hereafter, the processing will be described in accordance with the order of processing.

First, in S1, a search control unit 200 in the search server 2 transmits an acquisition request to a hierarchical control unit 100 in the hierarchical control server 1 and acquires information (hereafter referred to as "index candidate list") concerning a file (data) that becomes a candidate of index update. The request at the time of the acquisition includes information (date and/or hour) of time when index update (such as newly addition, overwriting, a change, and deletion) was executed the last time in the search server 2. The hierarchical control unit 100 causes the index candidate request to include identification information (such as NAME and ID) concerning files updated after the time information included in the request, and returns the index candidate list to the search control unit 200.

In S2, the search control unit 200 acquires information concerning a utilization situation such as capacities and remaining capacities of the storages 3 and 4 from an information provision unit 104 in the hierarchical control server 1, and generates storage management information 212.

In S3, the search control unit 200 determines which of data migration from the storage 3 to 4 and indexing is to be executed preferentially ("index update processing"). This determination is conducted by using sequence condition information 210 (FIG. 9) which indicates conditions concerning preferential execution of both kinds of processing.

In the sequence condition information 210, whether processing to be given priority is migration or indexing is defined every relation between a data storage capacity (capacity utilization rate) of Tier 1 storage 3 of an upper-hierarchy and the number of files that need index update (because of file update). For example, priority is given to the migration in a case where the capacity utilization rate is high (at least 85%), and priority is given to the indexing in a case where the capacity utilization rate is low (less than 80%). In a case where the capacity utilization rate is at least 80% and less than 85%, a priority relation is defined depending upon whether the number of files that need index update is large. In other words, the priority relation between both kinds of processing is determined considering the utilization situation of the Tier 1 storage 3 and the number of files that need index update.

In S4, in a case where the search control unit 200 has determined to execute the index update processing with priority, the search control unit 200 refers to the index candidate list acquired in S1, acquires pertinent files from the hierarchical control server 1, and conducts indexing (update).

In S5, as for a file completed in index update, the search server 2 transmits a response notice including the index update time and contents indicating a migration request of the file, to the hierarchical control server 1. As for a file determined to execute migration processing preferentially in S3, the search server 2 transmits a response notice including "null" instead of the index update time and including contents indicating a migration request of the file, to the hierarchical control server 1.

Specifically, the search server 2 causes the "response notice" to include information concerning the index update time and a priority flag indicating which of the index update processing and migration processing of the file from the storage 3 to 4 is given priority.

In S6, the hierarchical control server 1 checks the file included in the received response notice as a migration candidate from the storage 3 to 4, and makes a decision whether to cause migration ("migration processing"). This decision is executed utilizing a migration definition 112, which determines whether execution of migration processing is possible.

In S7, the hierarchical control server 1 executes migration processing of the file determined to execute migration, from the storage 3 to 4.

Heretofore, the outline of the principle of the computer system in the first embodiment has been described.

A concrete configuration of the computer system will now be described.

Figure 2:
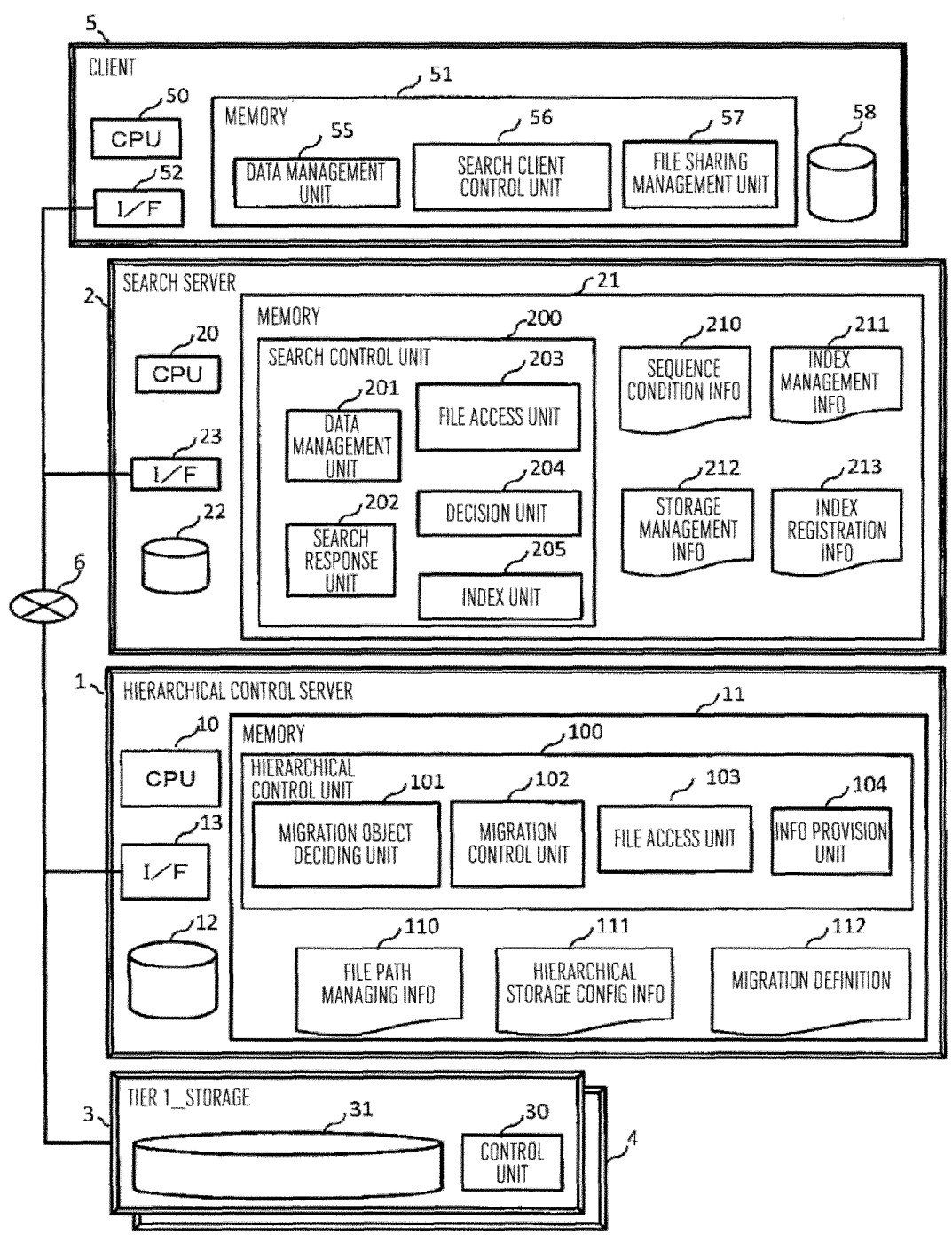
FIG. 2 is a block diagram schematically showing a configuration of the computer system according to the first embodiment.

FIG. 2 schematically shows the configuration of the computer system.

The hierarchical control server 1, the search server 2, and a plurality of storages 3 and 4 are included in a computer system, and are connected via a wire or wireless communication line 6 to be capable of conducting data communication. The computer system is configured to respond to a search request from the client 5 with a search result. As the communication line 6, a LAN, a WAN, the Internet or the like can be used. Depending upon the system configuration, various buses such as the PCI may be used in a part. Here, connection in a cascade or a link form can be applied to the hierarchical control server 1, the storage 3 (Tier 1), and the storage 4 (Tier 2). The hierarchical control server 1 can access data stored in the storages 3 and 4 by using one file path. By the way, the present invention is not restricted to this, but the hierarchical control server 1 may access files stored in the storage 3 and 4 by using independent file paths, respectively.

Furthermore, in the present embodiment, an example in which there are one search server 2 and one client 5 will be described for brevity. However, a configuration including a plurality of search servers and a plurality of clients may be used. In the same way, it is also possible to add other storages to the storages 3 and 4, which are hierarchical storages, hierarchically. It is also possible to use a configuration in which a plurality of storages are provided in the same hierarchy.

Furthermore, as for data stored in the storages 3 and 4, it is supposed that data stored in an external data source (not illustrated) is converted to a data form that can be utilized in the computer system by a data conversion function unit such as an ETL (not illustrated) and stored. The ETL may be configured physically as another computer device, or may be provided as a function of the hierarchical control server 1. A general-purpose server device is used as the hierarchical control server 1. A CPU 10, a memory 11, an auxiliary storage 12, and an I/F 13, which controls data communication with an external device, are provided in the hierarchical control server 1.

In the memory 11, the hierarchical control unit 100 is implemented by cooperation of the CPU 10 and a program. Furthermore, file path managing information 110, hierarchical storage configuration information 111, and the migration definition 112 are held in the memory 11.

In the hierarchical control unit 100, control concerning an access request for a file stored in the storages 3 and 4 and a response thereto, and control of selection of a target file of migration from the storage 3 to 4 and migration processing are executed. The hierarchical control unit 100 includes function units, i.e., a migration object deciding unit 101, a migration control unit 102, a file access unit 103, and the information provision unit 104.

The migration object deciding unit 101 executes "migration processing." For example, the migration object deciding unit 101 conducts selection of a target file to be moved from the storage 3 (Tier 1) to the storage 4 (Tier 2) from among a file group managed by the hierarchical control server 1. The "migration processing" is executed on the basis of the migration definition 112 described later or contents instructed by a system manager or the like via a GUI, a CLI or an API for migration request.

In the migration control unit 102, control of data migration between the storages 3 and 4 is executed. A file requested to store is first stored in the storage 3, which is the upper-hierarchy. Thereafter, in the migration control unit 102, access situation and so forth of files stored in the storage device 3 are managed and control for causing migration of files that are few in access frequency to the storage 4 of the lower-hierarchy is exercised. In addition, in the present embodiment, a migration instruction for a file determined to be a migration object by a migration object deciding unit 101 is issued to the storage 3 or 4.

In the file access unit 103, access control is executed for a file managed by the hierarchical control server 2 in response to a request from external such as the search server 2. For example, in a case where a file that is a request object is stored in the storage 3 (Tier 1), the target file is read out from the storage 3 and provided. On the other hand, in a case where the file of the request object has already migrated to the storage 4 (Tier 2), the request target file is read out from the storage 4 into the storage 3 and then provided to the request source.

When index update processing is executed in the search server 2, an access path of a pertinent file, an address of the search server 2 that is a source of access to the file, information concerning index update time, and the pertinent file are associated with a priority flag. The priority flag indicates whether priority is given to index update processing or to migration processing. A result is registered in the file path managing information 110.

FIG. 3 schematically shows the file path managing information 110. A logical path name 110*a* and a physical path name 110*b* corresponding thereto are associated with each other. An address or a host ID of the search server that has conducted access by utilizing these paths is registered in search server identifying information 110*c* when a response notice in the "index update processing" is received. In addition, completion time of the index update is registered in index update time 110*d*. Here, a logical address is not changed even if a physical address of a file is changed. At the time of access, translation of logical/physical address is conducted by the file access unit 103. Even if a file is moved from the storage 3 to the storage 4, therefore, a physical path (full path) of the file is newly associated with the former logical path.

In addition, information concerning preferential processing included in the response notice from the search server 2 is registered in a priority flag 110e. In a case where priority is given to index processing for the file, "index" is registered. In a case where priority is given to migration, "migration" is registered.

By the way, until the response notice from the search server 2 is received, "null" is registered in the search server identifying information 110c and the index update time 110d. In a case where "null" is registered, it can be determined that "index update processing" is not completed for the file.

It becomes possible to extract a file that has migrated to the Tier 2 storage 4 before latest contents of the file are reflected to the index, by utilizing the search server identifying information 110c and the index update time 110d. Specifically, it is a case where the Tier 2 storage 4 is already registered in the physical path name 110b, and when an index candidate list is requested from the search server 2, identification (ID) information of the search server 2 is the same as the search server identifying information 110c in the file path managing information 110. In addition, in the case, index update time of the last time specified by the search server 2 is later than the index update time 110d, and a final update time of the file is later than the search index update time 110d.

In the information provision unit 104, information concerning configurations of the server and storages connected to the hierarchical control server 2 is managed by using the hierarchical storage configuration information 111 (FIG. 4). In addition, in the information provision unit 104, acquisition and provision of information that the search server 2 is caused to manage as the storage management information 212 (FIG. 8) are conducted. The storage management information 212 (FIG. 8) will be described later.

FIG. 4 schematically shows the hierarchical storage configuration information 111. In the hierarchical storage configuration information 111, information such as a Tier name 111a, storage identification information 111b, a media classification 111c, and an access protocol 111d is associated with each other and registered.

In the Tier name 111a, information for indicating a management hierarchy of a storage is registered. For example, in a case where a storage is utilized as a Tier 1 storage, the storage is registered as "Tier 1." In the storage identification information 111b, an IP address or a host name is stored as identification information of a utilized storage. In the media classification 111c, information indicating a classification of a recording medium utilized in the storage. For example, "SSD," "HDD," or "magnetic tape" is stored. By the way, further detailed information may be registered. For example, in a case where an HDD is utilized, a serial number, information concerning a storage interface such as SAS or SATA, a vendor name, or the like may be registered. Furthermore, in a case of a tape device, identification information of a tape cartridge, a device vendor name, or the like may be registered.

In a case where an access request is issued to a storage, information indicating an access protocol to be utilized is stored in the access protocol 111d. For example, information indicates the NFS (Network File System) protocol or the LTFS (Linear Tape File System) protocol is stored. By the way, more detailed information may be added. For example, in a case where authentication processing is needed at the time of access, information for identifying the authentication method may be stored.

FIG. 6 schematically shows the migration definition 112. An algorithm or a policy for the hierarchical control unit 100 to select a file that performs migration is registered in the migration definition 112. For example, information representing a file satisfying what kind of information in which state when is set to be a migration object and what are the migration source storage and the migration destination storage is stored. By the way, in the present embodiment, an example in which, for example, an algorithm stated in an XML file form is used is applied. However, the file form is not restricted to this, but the file form may be a text form, a CSV form, a table form, or a record form.

Contents shown in FIG. 6 will now be described.

In "migrationPolicy," a start part and an end part of a policy definition are specified. In a case where a plurality of policy definitions exist, a distinction can be made by the id distribute of the present tag.

In "activateTime" tag, a start momentum of extraction processing of a migration candidate file is specified. In the present embodiment, the extraction processing is started at "01:00:00" every day.

In "src" tag, a migration source storage is specified. In the present embodiment, the storage 3, which is "Tier1" in Tier name, is specified. In the Tier name, a Tier name registered in the hierarchical storage configuration information 111 is utilized.

In "dest" tag, a migration destination storage is specified. In the present embodiment, the storage 4, which is "Tier2" in Tier name, is specified.

In "targetFilesystem" tag, a file system in which a file of the migration object is stored is specified. By the way, specification may be conducted by taking a file system as the unit, or specification may be conducted by taking an arbitrary directory in a file system as the unit. As for a specification method, a file system name may be used, or a directory path name may be used. In the present embodiment, a directory name "/dirA" is specified.

In "condition" tag, a condition under which a file of the migration object is extracted is specified. In a case where a plurality of conditions exist, a distinction is made by using an id attribute of the tag.

In a part in which the value of the id attribute in the "condition" tag is "1," in "filesystemUsageRange" tag, it is specified to conduct extraction of migration candidate files on the basis of a value of the capacity utilization rate of the migration source storage 3. In the present embodiment, extraction of files that become migration candidates is executed under conditions described later, in a case where the capacity utilization rate is in the range of "0% to 79%".

In extraction of files that are migration candidates, contents of "targetFile" tag are utilized. By "elapsedTimeAfterLastAccess" tag in the "targetFile" tag, it is specified to set a target file as a migration object in a case where elapsed time of the target file from a final access time exceeds a prescribed value. In the present embodiment, it is specified to set a file that has elapsed "10 days" from the final access time as an object. In "migrationOrder" tag, a migration order of a file of migration object is specified. In the present embodiment, an ascending order "asc" of time series order "chronological" of the final access time "atime" is specified. In "stopCondition" tag, a termination condition of the migration processing is specified. In the present embodiment, "CompletedMigrationAllcandidateFile" tag is specified. As a result, it is specified to terminate the processing if all files of migration candidates have performed migration.

Furthermore, in a part in which the value of the id attribute in the "condition" tag is "2," in "filesystemUsageRange" tag, it is specified to execute extraction of migration candidate files on the basis of a value of the capacity utilization rate of the migration source storage 3. In the present embodiment, extraction of migration candidate files is executed under conditions described later, in a case where the capacity utilization rate is in the range of "80% to 100%." In extraction of migration candidate files, contents of "targetFile" tag are utilized. By "elapsedTimeAfterLastAccess" tag in the "targetFile" tag, it is specified to set a target file as a migration object in a case where elapsed time of the target file from a final access time exceeds a prescribed value. In the present embodiment, it is specified to set a file that has elapsed "1 second" from the final access time as an object.

In "migrationOrder" tag, a migration order of a file of migration object is specified. In the present embodiment, an ascending order "asc" of time series order "chronological" of the final access time "atime" is specified. In "stopCondition" tag, a termination condition of the migration processing is specified. In the present embodiment, "filesystemUsageRange" tag is utilized. As a result, it is specified to terminate the processing if a specified range of capacity utilization rate is reached. Here, the specified range of capacity utilization rate is the range of "0 to 69%." In other words, in the case where the capacity utilization rate of the Tier 1 storage 3 is at least "80%," files elapsed at least "1 second" from the final access time are selected as migration candidate files, and file migration is executed in elapse order of the final access time. In addition, it is specified to terminate the migration processing if the capacitance utilization rate of the Tier 1 storage 3 has become "69%" or below.

Heretofore, the configuration of the hierarchical control server 1 has been described.

Referring back to FIG. 2, a configuration of the search server 2 will now be described.

A general-purpose server device is applied to the search server 2. The search server 2 includes a CPU 20, a memory 21, an auxiliary storage 22, and an I/F 23 which controls data communication with external. In the memory 21, the search control unit 200 is implemented by cooperation of the CPU 20 and a program. In addition, the sequence condition information 210, the storage management information 212, index management information 211, and index registration information 213 are held in the memory 21.

In addition, a data management unit 201, a search response unit 202, a file access unit 203, a decision unit 204, and an index unit 205 are included in the search control unit 200.

In the data management unit 201, a file system or a data base is provided. In the search response unit 202, a search request from the client 5 is received and a response to the search request with a search result is executed by using the index management information 211 and the index registration information.

In the file access unit 203, control concerning transmission and reception of file data managed in the hierarchical control server 1 is executed from the search server 2. In particular, transmission and reception control of an index update candidate file which needs update of a corresponding index because of file update or the like is also executed. Here, it is supposed that files include data of various forms such as structured data, such as a ledger sheet or a text, and non-structured data, such as images and voice. Furthermore, it is supposed that the files include meta data which is information concerning attributes or the like of these data.

The decision unit 204 determines which of indexing and migration is given priority as to a file that becomes an index update candidate. To be more detailed, the decision unit 204 determines processing given priority according to a utilization situation of the Tier 1 storage 3 indicated in the storage management information 210 described later and the condition of priority decision indicated in the sequence condition information 210.

In the index unit 205, processing of analyzing data (including the meta data) of an index update target file and reflecting a result to an index managed for search service is executed. Specifically, data and meta data of the index update target file acquired by the file access unit 203 are analyzed, and reflected to the index information 211 and the index registration information 213.

FIG. 5 schematically shows the index management information 211. In the index management information 211, index information generated by the search server 2 is managed. In the index management information 211, a keyword 211a and pertinent position information (211b to g) are associated with each other and managed. In the keyword 211a, a character string obtained by indexing processing on the target file is registered. In the pertinent position information, information concerning all files having the character string in the keyword 211a is associated and registered. As for one file, file identification information 211b (211e), pertinent position offset 211c (211f), and weight 211d (211g) are associated with each other. In addition, they are associated among files including the same keyword. In a case where only one file includes the same keyword, "null" is registered in information concerning other corresponding files.

In the file identification information 211b (211e), information for identifying a file in which the character string in the keyword appears is registered. Specifically, information registered in the file identification information 213a in the index registration information 213 described later is registered. By the way, a file path name, a file identifier, or the like to be used when actually accessing the target file may be registered.

In the pertinent position offset 211c (211f), offset information in which the character string of a keyword appears in the file is registered. In a case where the keyword appears in a plurality of places in one file, a plurality of pieces of offset information are registered.

In the weight 211d (211g), a degree of importance caused by appearance of the character string of the keyword in the offset in the file is registered as a value. The value of the degree of importance is set suitably by the search server 2. In order to set the value of the degree of importance, the search server 2 makes it possible to register specific identification information and a value of degree of importance associated therewith previously. For example, the search server 2 makes it possible to register header tags (such as "<H1>" and "<H2>") and enhancement tags (such as "<em>" and "<strong>") in an HTML form file and values of degree of importance associated with them. Upon finding the tag at the time of indexing, the search server 2 reflects a previously registered value as a value of degree of importance associated with a keyword extracted from a character string surrounded by the tag. As this value becomes large, importance increases. Furthermore, the degree of importance can be utilized to narrow down and line up search results.

FIG. 7 schematically shows the index registration information 213. In the index registration information 213, information concerning paths and meta data of files used as creation objects of a search index by the search server 2 is managed. In the index registration information 213, file identification information 213a, a file path name 213b, meta data 213c and so forth are associated with each other and managed.

In the file identification information 213a, identification information of files acquired by the search server 2 to create the search index is registered. The file identification information 213a may be a serial number given by the search server 2, or may be a serial number given by the hierarchical control server 1 in which the file is managed. By the way, besides a serial number, a character string that can be utilized for identification may be utilized. In the file path name 213b, a file path name in which the target file is stored is registered. The file path name 213b becomes the same as the logical path name 110a in the file path managing information 110 in the hierarchical control server 1. The search server 2 can specify the file path name 213b, issue a file acquisition request, and acquire the pertinent file.

In the meta data 213c, meta data acquired when indexing a file is registered. Owing to utilization of the index registration information 213, the search control unit 200 needs to utilize only the search index management information 211 in determining whether a character string coincides with a keyword in response to a search request with the keyword specified. As regards only a file satisfying a condition, the search control unit 200 can acquire information required to access the target file, from the index registration information suitably.

FIG. 8 schematically shows the storage management information 212. In the storage management information 212, utilization situations concerning the storages 3 and 4 utilized to determine which of the "migration processing" and "index update processing" is to be executed preferentially is managed. These utilization situations are acquired from the hierarchical control server 1 by the search server 2. In the storage management information 212, a Tier name 212a, storage identification information 212b, acquisition time 212c, a capacity utilization rate 212d, a remaining capacity 212e, an external inflow quantity 212f, an inflow quantity from other Tiers 212g, and an outflow quantity to other Tiers 212h are associated with each other and managed.

In the Tier name 212a, a hierarchy of a target storage is registered. In the Tier name 212a, the same name as the Tier name 111a in the hierarchical storage configuration information 111 in the hierarchical control server 1 is registered. In the storage identification information 212b, identification information of the storage device is registered. In the storage identification information 212b, the same information as the storage identification information 111b in the hierarchical storage configuration information described above is registered.

In the acquisition time 212c, information when these kinds of information concerning the storage are acquired is registered. In the capacity utilization rate 212d, information concerning a capacity utilization rate in the storage is stored. In the remaining capacity 212e, information concerning the remainder of the storage capacity in the storage is registered. In the external inflow quantity 212f, information concerning a data size stored additionally to the storage from devices other than the hierarchical control server 2 per unit time is registered. Here, an average inflow quantity may be registered, a maximum inflow quantity may be registered, or both of them may be registered. In the inflow quantity from other Tiers 212g, information concerning a data size stored additionally from storages belonging to other hierarchies per unit time is registered. Here, an average inflow quantity and/or a maximum inflow quantity may be registered. In the outflow quantity to other Tiers 212h, information concerning a data size that has migrated to storages belonging to other hierarchies per unit time is stored. Here, an average outflow quantity and/or a maximum outflow quantity may be registered.

By the way, information other than items indicated here may be stored. For example, information such as a CPU utilization rate of a storage and the number of simultaneous access sessions may be stored. Furthermore, the search server 2 may acquire these kinds of utilization information directly from the storages 3 and 4. In this case, the Tier name 212a and the storage identification information 212b should be acquired from the hierarchical control server 2 as occasion demands.

FIG. 9 schematically shows the sequence condition information 210. In the sequence condition information 210, a decision condition for determining which of migration processing in the hierarchical control server 1 and index update processing in the search server 2 is given priority and executed is registered.

In the sequence condition information 210, a capacity utilization rate 210a of the Tier 1 storage 3, the number of files that need index update 210b, and preferential execution processing 210c are associated with each other and managed. By using a value in the capacity utilization rate 210a of the Tier 1 storage 3 and a value in the number of files that need index update 210b, processing defined in the preferential execution processing 210c registered in respective pertinent entries is executed. For example, in a case where the capacity utilization rate 210a of the Tier 1 storage 3 is at least "85%," migration processing is executed preferentially regardless of the number of files that need index update. In a case where the capacity utilization rate of the Tier 1 storage is at least "80%" and the number of files that need index update is at least one million, indexing processing is executed preferentially. In a case where the capacity utilization rate of the Tier 1 storage is at least "80%" and the number of files that need index update is less than one million, migration processing is executed preferentially. In a case where the capacity utilization rate of the Tier 1 storage is less than "80%," indexing processing is executed preferentially.

As for the capacity utilization rate of the Tier 1 storage 3 utilized in the present embodiment, a value registered in the storage management information 212 is utilized. However, a value acquired each time may be utilized. Furthermore, as for the number of files that need index update, the number of entries in a list acquired when the search server 2 issues a request for a list of index update target files to the hierarchical control server 1 may be utilized.

Referring back to FIG. 2, a configuration of the storages 3 and 4 will now be described.

The storage 3 functions as an upper-hierarchy storage, and includes a control unit 30 and a storage medium 31. In response to a file access request from the hierarchical control server 1 or the client 5, transmission control of the pertinent file is executed in the control unit 30. Furthermore, in response to a migration instruction from the hierarchical control server 1, control is exercised in the control unit 30 to cause migration of data to the lower-hierarchy storage 4 or cause migration of data from the storage 4 to the storage 3.

As the storage medium 3, various storage devices can be applied. In the present embodiment, however, it is supposed that an SSD, which is excellent in access performance, is applied to the storage 3 and an HDD or magnetic tape, which is comparatively inferior in processing performance, is applied to the storage 4. By the way, these hierarchy storages may configure hierarchies according to whether processing performance or the storage capacity is high or large, may configure hierarchies according to prices of devices, or may configure hierarchies simply by using devices of the same kind and the same performance.

Finally, a configuration of the client 5 will now be described. A general-purpose server device or terminal computer is applied to the client 5. The client 5 may be an intermediate server, which receives a request from a user terminal computer, or a user terminal computer may transmit a search request directly to the search server 2. The client 5 includes a CPU 50, a memory 51, an auxiliary storage 58, and an I/F 52, which controls external data communication. In the memory 51, a data management unit 55, a search client control unit 56, and a file sharing management unit 57 are implemented by cooperation of the CPU 50 and a program.

In the search client control unit 56, a search request is issued to the search server 2, and an access request to a pertinent file issued to the hierarchical control server 1 is controlled on the basis of a response result to the search request. A search keyword is included in the search request issued to the search server 2. A full text search request can be issued, and a meta data search request with a search object meta data name and a search condition specified can also be issued. By the way, in the present embodiment, the client 5 can also issue a file search request to the search server 2 on the basis of an instruction input from a user.

In the data management unit 55, a file system or a database utilized to manage data storage in the client 5 is provided. In the file sharing management unit 57, a file sharing function utilized to access a file shared in the hierarchical control server 1 from the client 5 is provided.

By the way, the search client control unit 56 corresponds to a client program provided by the search server 2, or a program that provides a function according to specifications of the search server 2. For example, a form utilizing a web application program for search server may be used, or a form utilizing the general-purpose web browser may be used.

Heretofore, the configuration of the computer system has been described.

A flow of processing in the computer system will now be described. In the ensuing description, especially "index update processing (FIG. 10)" and "migration processing (FIG. 11)" will be described.

Figure 10:
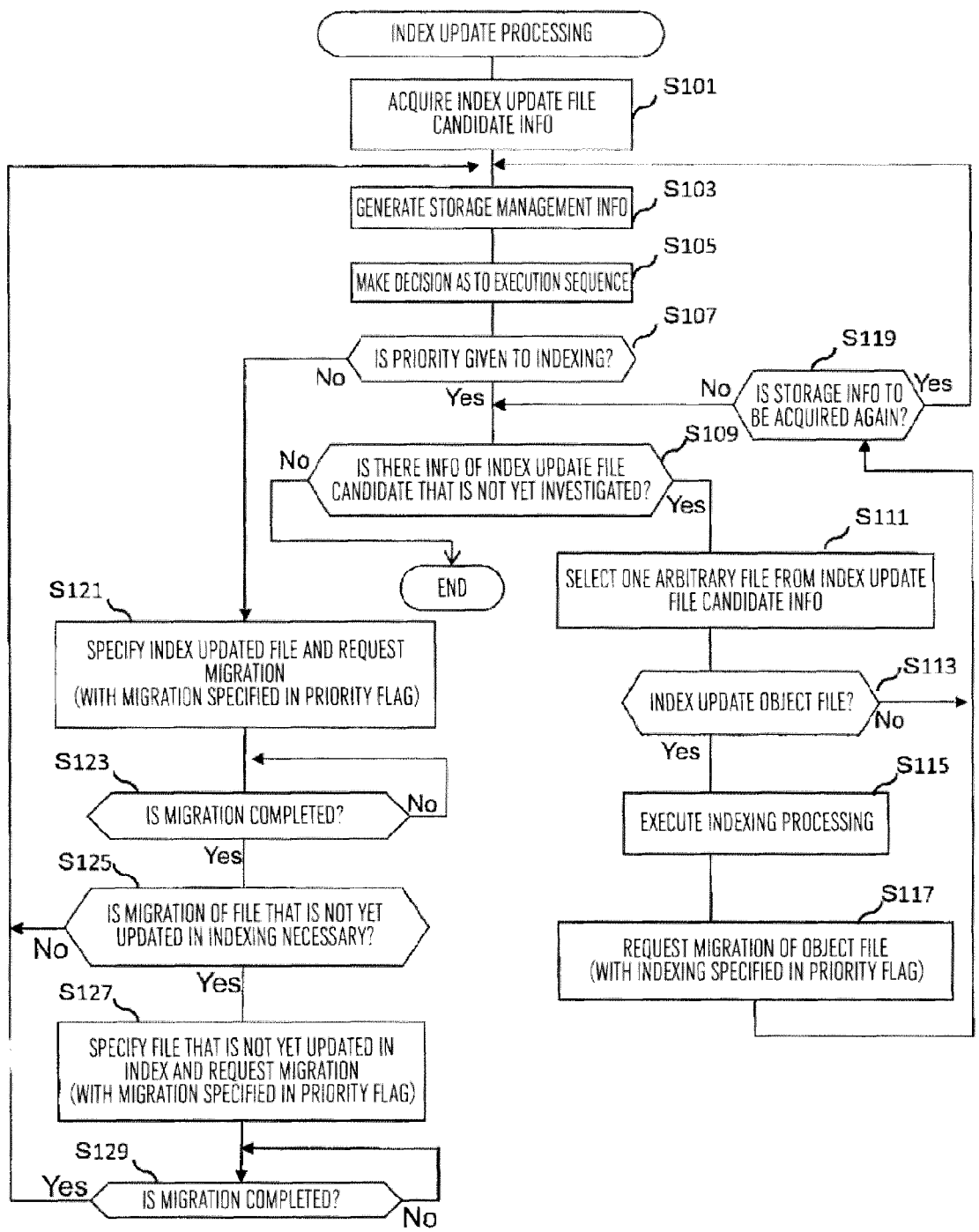
FIG. 10 is a flow diagram showing a flow of "index update processing" executed in the computer system according to the first embodiment.

FIG. 10 shows a flow of "index update processing." In the present processing, the search server 2 acquires necessary information from the hierarchical control server 1, and makes a decision which of migration processing and search index update processing is to be executed preferentially on the basis of the acquired information.

In S101, the file access unit 203 in the search server 2 transmits an acquisition request of an index candidate list to the hierarchical control server 1, and acquires the index candidate list. To be more precise, the file access unit 203 specifies an index update time of the last time in the acquisition request of the list. In addition, the file access unit 203 issues an acquisition request of information concerning files updated after the update time and files that were updated before the update time, but that are not reflected to the search index. Upon receiving the acquisition request, the file access unit 103 in the hierarchical control server 1 creates an index candidate list of files satisfying a specified condition and provides the search server 2 with the index candidate list.

In S103, the file access unit 203 generates the storage management information 212. Specifically, the file access unit 203 specifies items such as the remaining capacities and capacity utilization rates of the storages 3 and 4, issues an acquisition request of these kinds of information to the information provision unit 104 in the hierarchical control server 1, and acquires those kinds of information.

In S105, the decision unit 204 in the search server 2 makes a decision as to the execution sequence. Specifically, the search server 2 refers to the index candidate list acquired in S101, the storage management information generated in S103, and the sequence condition information 210, and makes a decision which of migration processing and index update processing is to be executed preferentially. As for the decision, the search server 2 makes the decision according to the condition in the sequence condition information 210 on the basis of the relation between the capacity utilization rate of the Tier 1 storage 3 in the storage management information 212 and the number of files that need index update in the index candidate list.

In S107, in a case where the decision unit 204 makes a decision to give priority to index update processing (S107: Yes), the decision unit 204 proceeds to S109. In a case where the decision unit 204 makes a decision to give priority to migration processing (S107: No), the decision unit 204 proceeds to S121.

In S109, the decision unit 204 makes a decision whether there is a file that is not yet investigated in the index candidate list. In a case where there is not a file that is not yet investigated (S109: No), the decision unit 204 exits the present flow and terminates the processing. In a case where there is a file that is not yet investigated (S109: Yes), the decision unit 204 proceeds to S111.

In S111, the decision unit 204 selects one arbitrary file that is not yet investigated from the index candidate list. Then, in S113, the search server 2 checks whether the selected file is a file of index update object. Specifically, the search server 2 checks whether the target file is already reflected to the index, and whether the target file has become an object that can be searched for in the search server 2. In a case where the selected file is an index update object (S113: Yes), the search server 2 proceeds to S115. In a case where the selected file is not an index update object (S113: No), the search server 2 proceeds to S119.

In S115, the index unit 205 in the search server 2 transmits an acquisition request for a target file to the hierarchical control server 1, acquires the target file, analyzes contents of the target file, and executes indexing processing.

After completion of the index processing, in S117, the file access unit 203 in the search server 2 gives a notice when the indexing is executed and a priority flag to the hierarchical control server 1 (which becomes a request for migration of the file to the hierarchical control server 1). By the way, in the hierarchical control server 1, which has received the notice, the index update time 110$d$ of the file in the notice is registered in the path managing information 110.

In S119, the decision unit 204 in the search server 2 makes a decision whether to confirm the storage management information 212. This processing is conducted to determine, for example, at what degree of intervals a situation change on the storage side should be considered in making the decision whether priority is given to migration processing or indexing processing in S105.

For example, in the execution sequence decision, various cases are conceivable as to the decision interval as follows. (1) Every target file, a decision is made on the execution sequence on the basis of the latest information on the storage side. (2) After the index candidate list is acquired at timing of S103, a decision is made on the execution sequence for processing of the list without acquiring the latest information on the storage side thereafter. (3) Until a determinate time elapses since the latest information on the storage side is acquired, the execution sequence decision in S105 is executed without acquiring the latest information. A manager can conduct policy setting as to the timing of (1) to (3). In S119, a decision can be made whether to acquire information on the storage side again.

In a case where it is determined to execute the execution sequence decision in S103 after acquiring storage information again (S119: Yes), the decision unit 204 returns to S103. In a case where it is determined to execute the execution sequence decision in S103 without acquiring storage information again (S119: No), the decision unit 204 returns to S109.

A flow of processing conducted in a case where it is determined in S107 that "priority is given to migration processing" (S107: No) because of execution of the execution sequence decision in S105 will now be described.

In S121, the file access unit 203 transmits a response notice with an index-updated file specified, to the hierarchical control server 1. Here, when transmitting the response notice, the search server 2 specifies migration as the priority flag.

In S123, the decision unit 204 checks whether migration of a file with the priority flag given from the storage 3 to the storage 4 is conducted. In a case where the migration is not completed (S123: No), the decision unit 204 waits and checks again. In a case where the migration is completed (S123: Yes), the decision unit 204 proceeds to S125.

In S125, the search server 2 checks whether migration processing in the hierarchical control server 1 is sufficient. In other words, the search server 2 makes a decision whether there is a file that is not yet updated in indexing and further migration is necessary.

Here, the decision unit 204 conducts the same processing as the above-described execution sequence decision conducted in S103, and makes this decision.

In a case where it is determined that migration of the file that is not yet updated in indexing is not necessary (S125: No), the processing returns to S103. In a case where it is determined that migration of the file that is not yet updated in indexing is necessary (S125: Yes), the file access unit 203 transmits a migration request with the file that is not updated in indexing specified to the hierarchical control server 1 in S127. When issuing a migration request here, the search server 2 issues the request with migration specified in the priority flag.

Then, in S129, the decision unit 204 checks whether the migration is completed. In a case where the migration is not completed (S129: No), the decision unit 204 waits and executes the check again. In a case where the migration is completed (S129: Yes), the decision unit 204 returns to S103.

Heretofore, the execution sequence decision processing has been described.

"Migration processing" in the hierarchy control server 1 will now be described. The present processing causes a file for which migration is specified as the priority flag by the search server 2 and which has become a migration candidate in the hierarchical control server 1 to migrate from the Tier 1 storage 3 to the Tier 2 storage 4.

Figure 11:
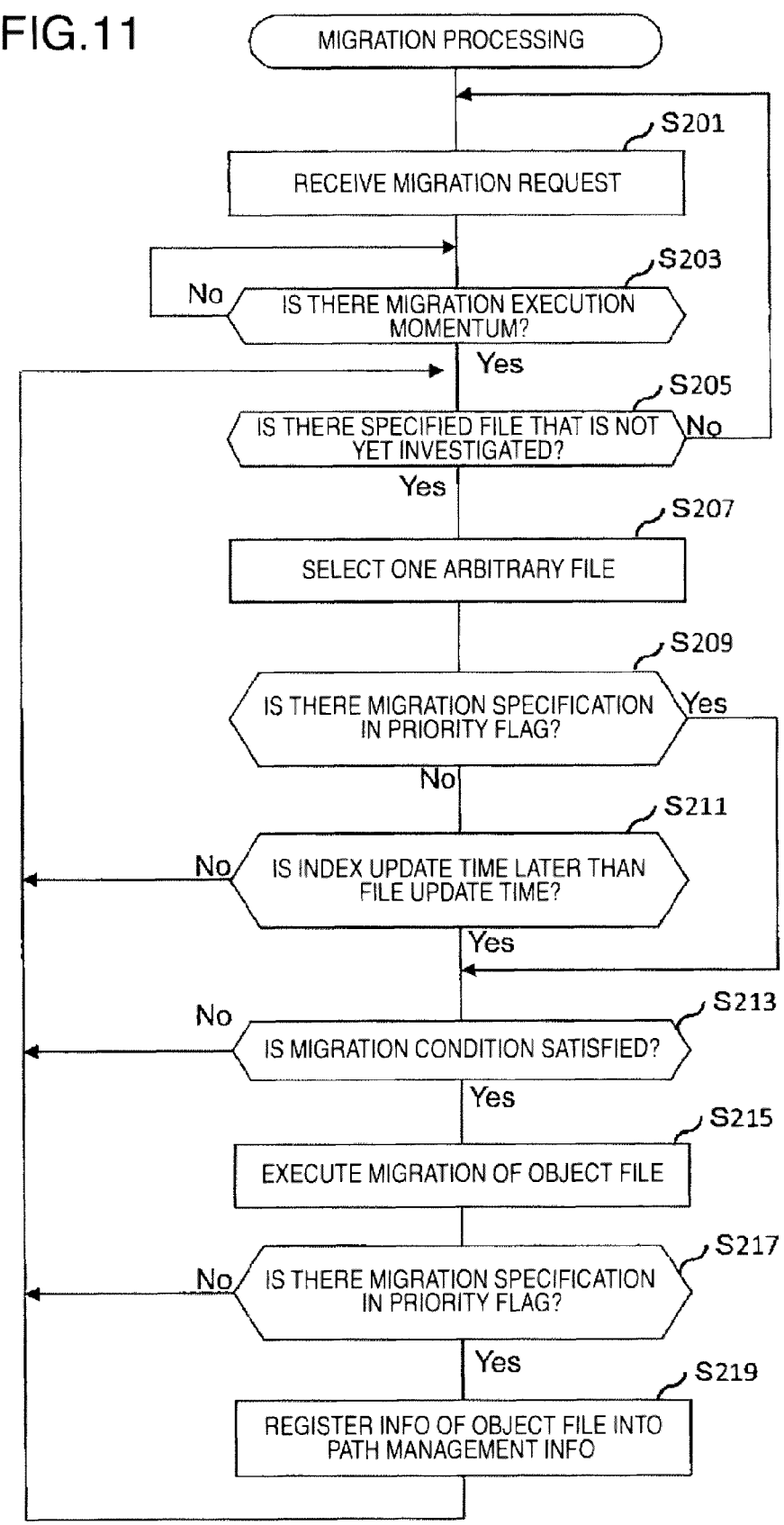
FIG. 11 is a flow diagram showing a flow of "migration processing" executed in the computer system according to the first embodiment.

FIG. 11 shows a flow of processing of "migration processing."

In S201, the migration object deciding unit 101 receives a migration request from the search server 1.

In S203, the migration object deciding unit 101 determines whether there is a migration processing execution momentum. Specifically, the migration object deciding unit 101 may determine whether there is a migration processing execution momentum on the basis of contents stated in the above-described migration definition 112. Or migration processing may be executed in a stage in which a determinate number of migration requests have arrived. Or migration processing may be executed in a stage in which a determinate time has elapsed since migration was executed the last time.

In a case where there is not a migration processing execution momentum (S203: No), the migration object deciding unit 101 waits for a determinate time and executes step S203 again. In a case where there is a migration processing execution momentum (S203: Yes), the migration object deciding unit 101 proceeds to S205.

In S205, the migration object deciding unit 101 checks all files specified in the migration request in S201 whether there is a file that is not yet investigated. In a case where there is not a file that is not yet investigated (S205: No), the migration object deciding unit 101 returns to S201. In a case where there is a file that is not yet investigated (S205: Yes), the migration object deciding unit 101 proceeds to S207 and selects one file that is not yet investigated from among files specified in the migration request.

In S209, the migration object deciding unit 101 refers to the path managing information 110 (FIG. 3), and checks whether migration is specified in a priority flag of the selected file. In a case where migration is specified in the priority flag (S209: Yes), it is meant that migration processing is to be executed preferentially as compared with index update processing and consequently the migration object deciding unit 101 proceeds to S215. In other words, migration processing is conducted no matter whether the target file is indexed by the search server 2.

On the other hand, in a case where indexing is specified in the priority flag (S209: No), it is meant that index update processing is to be executed preferentially as compared with migration processing. In the ensuing steps, therefore, the migration object deciding unit 101 investigates whether the target file is indexed by the search server 2.

In S211, the migration object deciding unit 101 determines whether indexing update time of the selected file is later than update time of the file. In other words, the migration object deciding unit 101 determines whether latest contents of the selected file can be reflected to the search index in the server 2. In a case where the search index update time is earlier than the file update time (S211: No), the latest contents of the selected file is not reflected to the search index, and consequently the file is removed from the migration object at this time point and the processing returns to S205.

In a case where the search index update time is later than the file update time (S211: Yes), the latest contents of the selected file is already reflected to the search index, and consequently the file becomes a migration object and the processing proceeds to S213.

In S213, the migration object deciding unit 101 determines whether the selected file satisfies the migration condition. Specifically, the migration object deciding unit 101 refers to the migration definition 112 and determines whether the condition is satisfied. In a case where the condition is satisfied (S213: Yes), the processing proceeds to S215. In a case where the condition is not satisfied (S213: No), the processing returns to S205.

In S215, the migration object deciding unit 101 transmits a request for causing migration of the selected file from the Tier 1 storage 3 to the Tier 2 storage 4, to the migration control unit 102 and causes file migration to be executed. Furthermore, together therewith, the migration control unit 102 updates the physical path name 110b of the migration file in the file path managing information 110 with a physical path name in the storage 4 which is the movement destination.

In S217, the migration control unit 102 checks the path managing information 110 (FIG. 3) whether the priority flag 110e of the file caused to migrate in S215 specifies migration. In a case where migration is specified (S217: Yes), the processing proceeds to S219. In a case where migration is not specified (S217: No), the processing returns to S205.

In S219, the migration control unit 102 registers the index update time of a file specified as migration to the index update time 110d in the path management table 110 additionally. By the way, the index update time information is included in the migration request issued to the hierarchical control server 1 by the data management unit 201 in the search server 2. This registration is conducted to utilize when detecting a file for which latest contents are not indexed in the search server 2 from among files that have migrated to the Tier 2 storage 4, which is the lower-hierarchy. In other words, in a case where a file is caused to migrate in a situation in which the priority flag is specified as migration, there is a possibility that that the file will not be indexed in the search server 2. The registration is conducted to facilitate extraction of such a file on the basis of information registered in the file path managing table 110.

Heretofore, the flow of the "migration processing" has been described.

According to the computer system in the present embodiment, index update can be conducted easily in the system utilizing hierarchical storages without generating a load such as return of files to the upper-hierarchy, in this way. In addition, it is not necessary to conduct complicated scheduling between the migration processing and the index update processing, resulting in a simple configuration.

In addition, according to the computer system in the present embodiment, the priority relation between the migration processing and the index update processing is controlled depending upon the capacity utilization rates of the hierarchical storage and the number of files that need index update. Therefore, there is an effect that a suitable index can be generated while securing the performance and convenience of hierarchical storages.

The computer system in the present embodiment exhibits an effect especially in an environment in which the number of the search servers 2 increases and decreases (especially frequently). An effect of contributing to usability of system construction remarkably can be anticipated.

Second Embodiment

When the search server 2 conducts "index update processing" in the computer system according to the first embodiment, migration processing is executed preferentially in some cases depending upon a condition in the sequence condition information 210 (FIG. 9) or the like. For example, migration processing is executed preferentially in a case where the capacity utilization rate of the Tier 1 storage 3 is at least "85%" or the like. In this case, an updated file is caused to migrate to the lower-hierarchy storage before it is subject to index update in some cases.

As for the update file moved to the lower-hierarchy storage before index update, file data is read from the lower-hierarchy storage into the upper-hierarchy storage in order to update the index in "index update processing" of the next time in the search server 2 and "index update processing" is executed.

However, it is supposed that the load of the hierarchical storage, especially the Tier 1 storage 3 is high or the capacity thereof is tight. In this case, there is also a fear that the processing itself of reading out the file of the index update object into the lower-hierarchy storage by the momentum of the "index update processing" of the next time will promote the load increase and capacity tightness.

In the computer system according to the second embodiment, therefore, the load situation of the hierarchical storage 3 and/or 4 is monitored at a periodic or arbitrary momentum, the index update file moved to the lower-hierarchy at the time of low load of the storage is read out into the upper-hierarchy storage, and index update is conducted.

Figure 12:
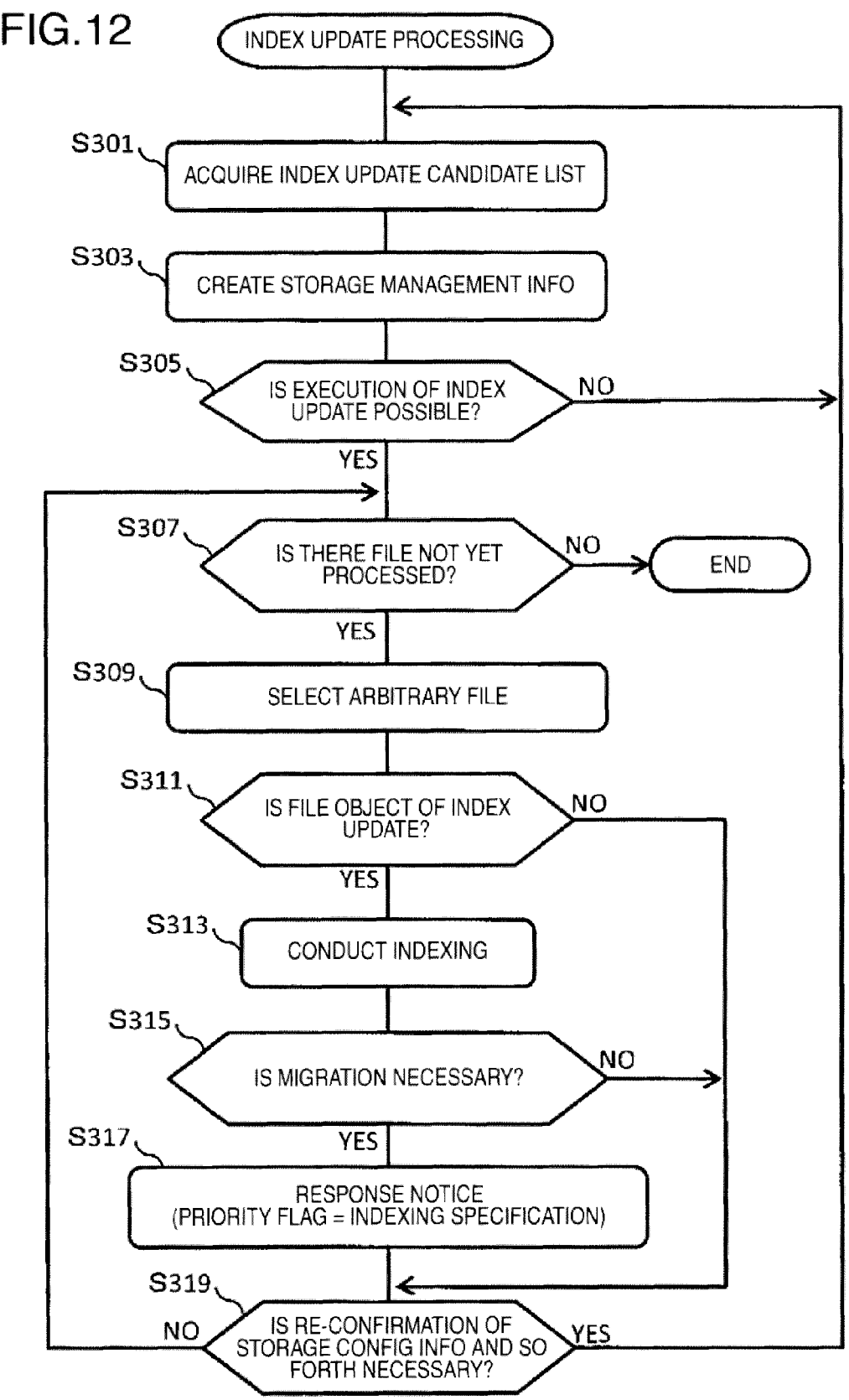
FIG. 12 is a flow diagram showing a flow of "index update processing" executed in the computer system according to the first embodiment.

FIG. 12 shows a flow of "index update processing" in the computer system according to the second embodiment.

In the present processing, a search server 2 acquires necessary information from a hierarchical control server 1, and then investigates the load situation of the hierarchical storage environment. In a case where the load is low and there is a file requiring indexing in a lower Tier storage, the search server 2 requests the hierarchical control server 1 to read out a target file and conducts indexing on the target file. When reading out the target file, reading out of the file from the lower Tier storage into an upper Tier storage is also conducted. Furthermore, after indexing is finished, the search server 2 issues a migration request of the target file as occasion demands. Hereafter, a concrete processing flow will be described.

In S301, the search server 2 transmits an acquisition request of the index candidate list to the hierarchical control server 1, and acquires the index candidate list. By the way, the index update time of the last time is specified in the acquisition request in the same way as the first embodiment. The acquisition request requests acquisition of files updated on and after the update time of the last time and files updated before the update time of the last time but not reflected into the search index. In the second embodiment, a point that the acquisition request requests acquisition of information concerning such files stored in the Tier 2 storage 4 is one of features. The hierarchical control server 1 creates a list of files satisfying a specified condition, and provides the search server 2 with the list.

In S303, the search server 2 acquires information concerning the utilization situation of the storages and creates the storage management information 212 in the same way as the first embodiment.

In S305, the search server 2 refers to the index candidate list acquired in S301 and the storage management information 212 generated in S303, and makes a decision whether index update processing of index updating candidate files stored in the Tier 2 storage 4 can be executed. For example, considering the number of files entered in the index candidate list and the load situation of the Tier 1 storage 3 indicated by the storage management information 212, a decision is made whether the Tier 1 storage 3 has a margin in performance to execute index update processing (for example, a low load). The decision whether there is a margin is made by using a predetermined performance threshold and so forth.

In a case where a decision that the index update processing cannot be executed (S305: No), the search server 2 waits for a determinate time and then makes a transition to S301 and repeats processing. In a case where a decision that the index update processing can be executed (S305: Yes), the search server 2 proceeds to S307.

In S307, the search server 2 investigates all files registered in the index candidate list acquired in S301 whether there is a file not yet processed for which subsequent steps are not executed. In a case where there is not a file not yet processed (S307: No), the present processing is finished. In a case where there is a file not yet processed (S307: Yes), the search server 2 selects an arbitrary file not yet processed from the index candidate list in S309.

In S311, the search server 2 determines whether the selected file is an index updating target file. Here, from a viewpoint whether the target file is already reflected to the search index and a viewpoint whether the target file has become a searchable object in the search server 2, determination is conducted. In a case where the selected file is not an index updating target file (S311: No), the search server proceeds to S319 described later. In a case where the selected file is an index updating target file (S311: Yes), the search server 2 reads out the file from the hierarchical control server 1, analyzes contents of the file, and conducts indexing in S313.

In S313, the search server 2 makes a decision whether to request the hierarchical control server 1 to conduct migration processing of a file completed in indexing (step S315). Here, the search server 2 may make a decision on the basis of a predetermined policy, or may make a decision on the basis of a load state in the hierarchical storage environment. In a case where a migration request is not issued (S315: No), the search server 2 makes a transition to S319 described later. In a case where a migration request is issued (S315: Yes), the search server 2 gives a response notice concerning the target file to the hierarchical control server 1 (the search server 2 requests the hierarchical control server 1 to conduct migration processing. By the way, index update time and a priority flag are included in the response notice in the same way as the first embodiment. "Indexing" is specified in the priority flag.

In S319, the search server 2 determines whether to confirm storage configuration information. In other words, this corresponds to acquiring latest information concerning the utilization situation of the storage and the number of index update candidates again at this time point and determining whether to continue the index update processing in the same way as the first embodiment. As for this determination, a system manager may specify previously on the basis of what policy the determination is to be conducted. For example, a decision may be made whether execution is possible on the basis of the latest information every day, or a decision may be made only once at first. Or a decision may be made in a stage in which a determinate number of files have been indexed, or a decision may be made in a stage in which a determinate time has elapsed since a decision was made the last time. In a case where a decision is made to create the storage management information 212 again and then continue the processing (S319: Yes), the processing makes a transition to S301. In a case where a decision is made not to create the storage management information 212 (S319: No), the processing makes a transition to S307.

According to the computer system in the second embodiment, it is possible in index update processing of a file for which migration processing is executed preferentially to execute index update processing without promoting the load on the hierarchical storage side, in this way. At the same time, it becomes possible to utilize resources of the hierarchical storages further effectively and the frequency of index update can be increased because of shortened processing time of index update. Therefore, it can be said that the computer system according to the second embodiment can contribute to improve the convenience of users.

Heretofore, the first and second embodiments of the present invention have been described. However, the present invention is not restricted to them, but various configurations can be taken without departing from the spirit. For example, it is also possible to configure the decision unit 204 and the like in the search server 2 as a function unit in the hierarchical control server 1 or another external server. Furthermore, it is also possible to change the processing order of processing procedures of respective function units as well suitably without departing from the spirit.

Furthermore, in the first and second embodiments, an example of function units implemented by cooperation between a program and a CPU has been described. However, it is also possible to configure a part of them as hardware.

REFERENCE SIGNS LIST

1: Hierarchical control server
2: Search server
3: Tier 1 storage
4: Tier 2 storage
5: Client
100: Hierarchical control unit
101: Migration object deciding unit
110: Path managing information
112: Migration definition
200: Search control unit
210: Sequence condition information
212: Storage management information

The invention claimed is:
1. A computer system comprising:
a storage unit for storing a utilization situation of an upper-hierarchy storage area in a hierarchical storage including the upper-hierarchy storage area and a lower-hierarchy storage area;
a decision unit for determining which of index processing of data that is included in data stored in the hierarchical storage and that becomes an index update candidate and migration processing of moving the data to the lower-hierarchy storage area is to be conducted preferentially, depending upon the utilization situation; and
a control unit for moving the data that becomes the index update candidate to the lower-hierarchy storage area on the basis of a result of the determination,
wherein in a case where a decision result of the decision unit is preferential processing of migration, the control unit moves data that becomes the index update candidate for which the index processing is not executed, to the lower-hierarchy storage area,
wherein the control unit moves data that becomes the index update candidate for which the index processing is executed, to the lower-hierarchy storage area earlier than data that becomes the index update candidate for which the index processing is not executed.

2. The computer system according to claim 1, wherein
at least information concerning a use quantity or an unused quantity of the upper-hierarchy storage area is included in the utilization situation of the upper-hierarchy storage area, and
the decision unit determines to conduct the index processing preferentially when the use quantity of the upper-hierarchy storage area is less than a predetermined capacity.

3. The computer system according to claim 1, wherein
the control unit re-moves data that becomes the index update candidate for which the index processing is not executed and that is moved to the lower-hierarchy storage device, to the upper-hierarchy storage area, and
the decision unit sets the re-moved data to be an object of the decision of the next time as data that becomes the index update candidate.

4. The computer system according to claim 3, wherein
the control unit re-moves data that becomes the index update candidate for which the index processing is not executed and that is moved to the lower-hierarchy storage device, to the upper-hierarchy storage area according to a utilization situation of the upper-hierarchy storage area.

5. The computer system according to claim 1, wherein
the computer system comprises a search device which conducts search processing of data stored in the hierarchical storage in response to a request, and
the decision unit is included in the search device.

6. The computer system according to claim 1, wherein
the computer system comprises a management device which manages the hierarchical storage, and
the decision unit is included in the management device.

7. The computer system according to claim 1, wherein
the computer system comprises a search device which conducts search processing of data stored in the hierarchical storage in response to a request, a management device which manages the hierarchical storage, and a control device which differs from the search device and the management device and which is connected to the search device and the management device to be able to conduct data communication therewith, and
the decision unit is included in the control device.

8. A data management method of a computer system including a hierarchical storage in which hierarchical management of storage areas where data is stored is conducted depending upon a utilization situation of stored data, the data management method comprising:

a step of causing a control unit in the computer system to acquire a utilization situation of an upper-hierarchy storage area in the hierarchical storage;

a step of causing the control unit in the computer system to determine which of index processing of data that becomes an index update candidate in data stored in the hierarchical storage and migration processing of moving the data to a lower-hierarchy storage area in the hierarchical storage is given priority depending upon the use situation; and a step of causing the control unit in the computer system to execute index processing or migration processing of the data that becomes the index update candidate in response to the determination, wherein in a case where the control unit determines that processing of migration is given priority, the control unit is caused to move data that becomes the index update candidate for which the index processing is not executed, to the lower-hierarchy storage area, wherein the control unit is caused to move data that becomes the index update candidate for which the index processing is executed, to the lower-hierarchy storage area earlier than data that becomes the index update candidate for which the index processing is not executed.

9. A non-transitory computer-readable non-temporary recording medium storing a program to cause a computer including a hierarchical storage in which hierarchical management of storage areas where data is stored is conducted depending upon a life cycle of stored data to execute:

a procedure for acquiring a use situation of an upper-hierarchy storage area in the hierarchical storage;

a procedure for determining whether to execute index processing of data that is included in data stored in the hierarchical storage and that becomes an index update candidate depending upon the use situation;

a procedure for causing migration of a file of the index update candidate to a lower-hierarchy storage area in the hierarchical storage without conducting index processing of the file, in a case where index processing is not executed by the determination; and a procedure for causing migration of a file of the index update candidate for which indexing update time of the file is later than file update time of the file, to the lower-hierarchy storage area.

* * * * *